United States Patent
Mickelson

[15] 3,637,091
[45] Jan. 25, 1972

[54] MOLDED PLASTIC BELT CONVEYOR

[72] Inventor: Raymond N. Mickelson, 12424 Guilford Drive, Milwaukie, Oreg. 97222

[22] Filed: Apr. 7, 1970

[21] Appl. No.: 26,339

[52] U.S. Cl.............................................198/184, 198/153
[51] Int. Cl.......................................................B65g 15/00
[58] Field of Search..................198/184, 128, 193, 131, 151; 221/72

[56] References Cited

UNITED STATES PATENTS

| | | | |
|---|---|---|---|
| 3,021,978 | 2/1962 | Cunliffe | 221/72 |
| 2,310,646 | 2/1943 | Morgan | 198/184 |
| 616,688 | 12/1898 | Richards | 198/184 X |
| 3,039,594 | 6/1962 | Lucas | 198/128 |
| 3,363,804 | 1/1968 | Frasier | 221/72 |

FOREIGN PATENTS OR APPLICATIONS 1,129,418  5/1962  Germany..............................198/184

*Primary Examiner*—Evon C. Blunk
*Assistant Examiner*—Hadd S. Lane
*Attorney*—Buckhorn, Blore, Klarquist and Sparkman

[57] ABSTRACT

A conveyor utilizes a molded plastic belt having a plurality of longitudinally spaced, open top pocketlike receptacles formed integrally therein, the belt being supported by clips between a pair of cables.

3 Claims, 4 Drawing Figures

PATENTED JAN 25 1972
3,637,091
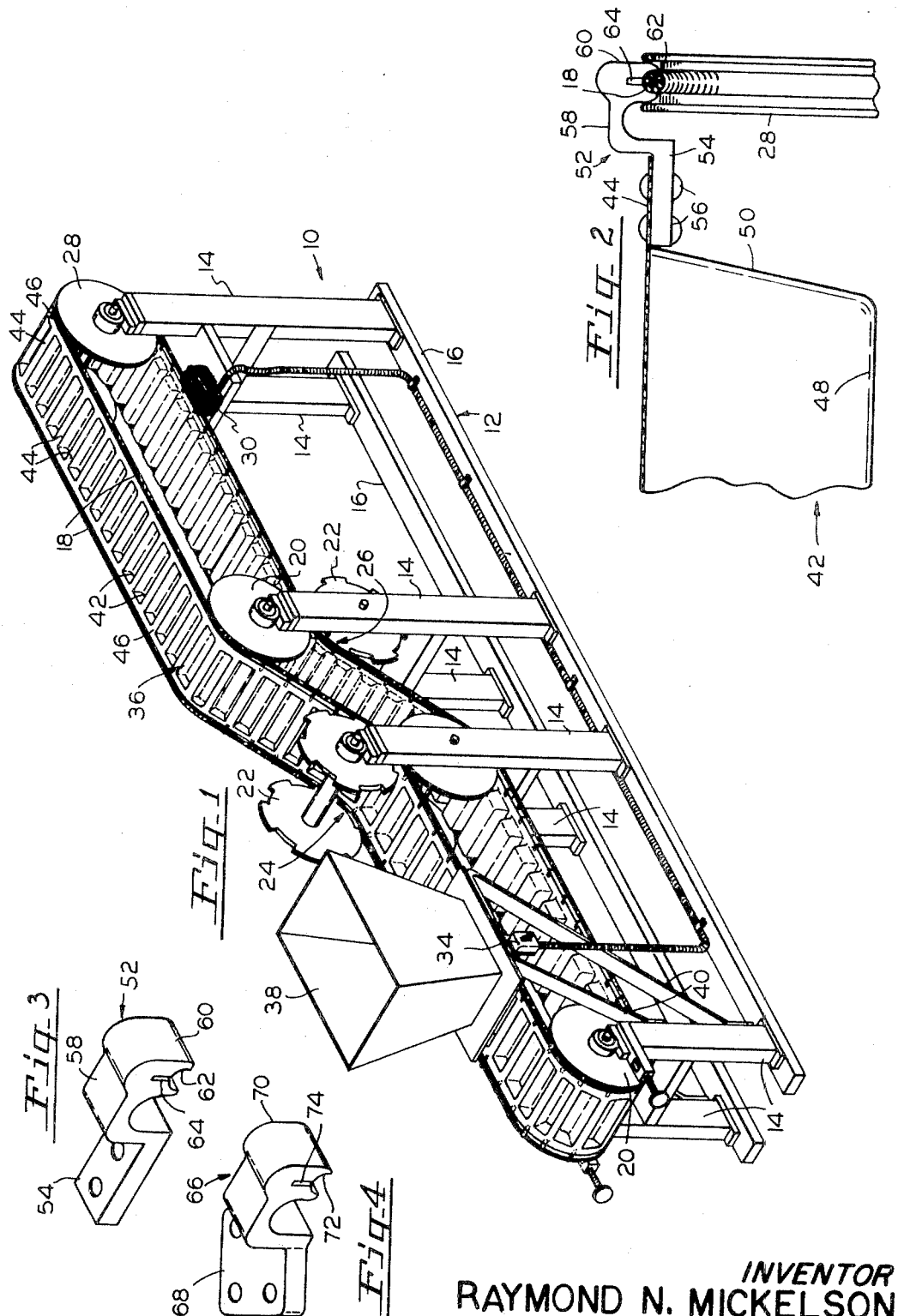
INVENTOR
RAYMOND N. MICKELSON
BY
BUCKHORN, BLORE, KARQUIST & SPARKMAN
ATTORNEYS 3,637,091

MOLDED PLASTIC BELT CONVEYOR

BACKGROUND OF THE INVENTION

This invention relates to conveyor systems and, more particularly, to a conveyor system utilizing a molded plastic belt. The object of the invention is to provide a continuous bucket-type of conveyor that will be very light, thereby to permit relatively long reaches between supports.

A further object of the invention is to provide such a conveyor wherein the belt is particularly adaptable to the making of short radius turns out of the plane of the belt.

A still further object of the present invention is to provide such a conveyor wherein the belt will bear the weight of the products conveyed, but none of the driving tension.

A still further object of the present invention is to provide such a conveyor wherein the belt is secured directly at its transverse edges to driving cables so that the belt need not ride over idlers, rollers or the like.

SUMMARY OF THE INVENTION

In accordance with these objects, I have provided a conveyor comprising a pair of generally parallel continuous cables and a continuous belt disposed between such cables, the belt being adapted to carry a wide variety of commodities.

The belt is desirably made of molded plastic material, such as polypropylene, and comprises a plurality of open top pocketlike receptacles for carrying the commodities and a pair of opposite, longitudinally extending flanges or edge portions, the receptacles being separated by laterally extending flanges.

A plurality of clip means are attached to the edge portions of the belt to secure the edges to the cables. Each such clip means comprises a tab at its inboard end which is attached to the belt and an offset portion at its outboard end which is provided with a grooved portion for gripping the cable.

The cables are supported on suitable sheaves and driven by suitable conventional means.

BRIEF DESCRIPTION OF THE DRAWINGS

FIG. 1 is a perspective view of a conveyor made according to the present invention.

FIG. 2 is a sectional view to an enlarged scale taken on line 2—2 of FIG. 1.

FIG. 3 is a perspective view of a clip adapted to attach the conveyor belt to the cable.

FIG. 4 is an alternative embodiment of a clip suitable for the above purpose.

DESCRIPTION OF THE PREFERRED EMBODIMENT

Referring to the drawings and in particular to FIGS. 1 and 2, a conveyor 10 according to the present invention is mounted on a frame 12 having a plurality of uprights 14 attached to base members 16. A pair of continuous nylon-coated steel cables 18 train over idler wheels 20 journaled on the uprights 14. Additional idler wheels 22 are utilized where necessary to insure small radius turns out of the plane of the cables 18, as at 24 and 26.

The cables 18 are driven by driving wheels 28 powered by a motor 30 through a suitable belt drive (not shown). Power to the motor 30 is controlled by a switch 34.

A continuous conveyor belt 36 is disposed between the cables 18. A hopper 38 mounted on supports 40 is adapted to load the belt 36 with a variety of transportable commodities such as processed foods or light packaged commodities.

The belt 36 is desirably made of a moldable plastic material such as polypropylene, although other plastic materials may be suitable. Where polypropylene has been used in the transportation of processed foods, a 30-mil-thickness has been found satisfactory. Polypropylene is particularly suitable for this purpose since it resists cracking, it flexes readily, it has an extremely high fatigue life, it is abrasion resistant and it is easily cleaned. The belt comprises a plurality of open top pocketlike receptacles 42 formed between longitudinally extending flange or edge portions 46 and laterally extending flanges 44.

Each of the receptacles 42 comprises a bottom portion 48 which is parallel to the flanges 44, 46 and four inwardly converging sides 50. This form of construction is particularly suitable for processed food stuffs, making it unlikely that any will be caught within a receptacle. The design is also particularly suitable for the making of short radius turns out of the plane of the belt, since the receptacles 42 prevent spillage of the products conveyed.

While it is contemplated that in some installations the belt 36 could be made in a length that would require only one joint, in other cases sections of the belt might be fabricated in shorter lengths requiring additional joints.

A feature of the invention resides in the fact that the belt 36 is attached at its edges 46 to the cables 18 by means of a plurality of clips 52 as shown in FIGS. 2 and 3. Each such clip 52 comprises an inwardly extending rectangular tab 54 which is attached to the transverse flange 44 by means of two rivets 56.

Each clip 52 further comprises an offset portion 58 which terminates in a grooved portion 60 adapted to grip the cable 18 and ride thereon. The grooved portion 60 has a cable receiving groove 62 therein at the top of which is provided a vertically extending slot 64 which permits a springing or yielding action to occur, thereby to permit the clip 52 yieldingly to grip the cable 18 with a snaplike action.

In this manner when power to the cable 18 is provided by the motor 30, none of the tension is transmitted to the belt 36 inasmuch as the clips 52 can move or adjust their positions on the cables 18. Furthermore, if the cables 18 stretch, as would happen under a sudden or shock loading, the clips 52 can slide a bit on the cables 18, further to prevent the transmission of any stress to the plastic belt 36. Thus only the cables 18 are under tension and the belt 36 bears only the weight of the product conveyed. Although the cables 18 are illustrated as being supported by the idler wheels 20, 22 and 28, this manner of suspension eliminates the need for the belt itself to be supported by rollers or idlers, thereby simplifying the construction and maintenance of the conveyor.

FIG. 4 illustrates an alternative embodiment of a clip 66 suitable for use with the conveyor of the present invention. Clip 66 has an inwardly extending tab 68 of square plan form for attachment to the transverse edges 46 of the belt 36 by means of three rivets (not shown). An offset portion 70 is provided having a groove 72 for riding on the cables 18 and a vertically extending slot 74 therein provides the yielding or springing action above mentioned.

While a preferred embodiment of my invention has been described herein, it should be apparent that the invention permits of modification in arrangement and detail.

I claim:

1. A conveyor comprising
a pair of generally parallel continuous cables;
a continuous conveyor belt disposed between said cables and adapted to carry a commodity thereupon, said belt comprising
a plurality of open top trays integrally joined and each presenting a pocket, and
flange means integral with the open top of each of said pockets and extending transversely thereto to form the edges of said belt;
clip means attached to said flange means for securing said edges of said belt to said cables, said clip means comprising
a tab at the inner end of each of said clip means,
means to attach each of said tabs to said edges of said belt, and
an offset portion at the outer end of each of said tabs, each of said offset portions being provided with generally semicylindrical cable-receiving groove means for receiving said cables therein, said groove means each being provided with spring means to permit said offset portions yieldingly but detachably to grip said cables with a snaplike action;

means to support said cables; and means to drive said cables, thereby to drive said belt secured thereto.

2. A conveyor as in claim 1 in which said spring means comprise a slot in each of said groove means, said slots permitting said offset portions to grip said cables when said groove means are placed thereupon.

3. A conveyor as in claim 1 in which said flange means extend peripherally around said open top of each of said pockets, said flange means being integral with each other in the direction of travel of said belt to form a continuous series of pockets depending therefrom.

* * * * *